US006385663B2

(12) United States Patent
Senator

(10) Patent No.: US 6,385,663 B2
(45) Date of Patent: *May 7, 2002

(54) DEVICE I/O MONITORING MECHANISM FOR A COMPUTER OPERATING SYSTEM

(75) Inventor: Steven T. Senator, Colorado Springs, CO (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/141,491

(22) Filed: Aug. 27, 1998

Related U.S. Application Data

(62) Division of application No. 08/544,933, filed on Oct. 18, 1995, now Pat. No. 5,809,303.

(51) Int. Cl.$^7$ ................................................. G06F 9/54
(52) U.S. Cl. .............................. 709/325; 717/4; 710/18
(58) Field of Search ........................ 709/301, 302–305, 709/321–327, 318; 395/704; 717/4; 710/18

(56) References Cited

U.S. PATENT DOCUMENTS

| | | | | |
|---|---|---|---|---|
| 3,748,650 A | * | 7/1973 | Garcia et al. | 710/18 |
| 5,287,504 A | * | 2/1994 | Carpenter et al. | 702/201 |
| 5,548,784 A | * | 8/1996 | Easley, Jr. et al. | 710/18 |
| 5,586,268 A | * | 12/1996 | Chen et al. | 710/38 |
| 5,628,029 A | * | 5/1997 | Evoy | 710/18 |
| 5,680,620 A | * | 10/1997 | Ross | 717/4 |
| 5,784,615 A | * | 7/1998 | Lipe et al. | 709/301 |
| 5,874,960 A | * | 2/1999 | Mairs et al. | 345/340 |

FOREIGN PATENT DOCUMENTS

| EP | 0 670 539 A1 | 9/1995 |
|---|---|---|

OTHER PUBLICATIONS

Mashlan, Robert, "Capturing Hot Keys in Windows," Windows/DOS Developer's Journal, pp(7), Jan. 1995.*

Dinallo, Chris, "Understanding Audio Device Driver Architecture", OS/2 Magazine, pp. (1–7), May 1994.

Mery, David, "Serial killer", EXE: The Software Developers Magazine, p. (5), Oct. 1994.

Bonneau, "A VxD to Monitor DOS Output", Windows Developer Journal, p. (33), May 1994.

Mitchell, Stan, "Monitoring Windows 95 File Activity in Ring O". Windows Developer's Journal, p. (23), Jul. 1995.

Bacon, D.F., "File system Measurements and Their Application to the Design of Efficient Operation Logging Algorithms," Proceedings of the Symposium on Reliable Distributed Systems, Sep. 30–Oct. 2, 1991, No. Symp. 10, Sep. 30, 191, Institute of Electrical and Electronics Engineers, pp. 21–30.

"Diagnostic Kernel Extension." IBM Technical Disclosure Bulletin, vol. 35, No. 5, Oct. 1, 1992, pp. 137–138.

"Poll and Select Function for Cascaded Device Drivers on a UNIX Operating System," IBM Technical Disclosure Bulletin, vol. 34, No. 10A, Mar. 1, 1992, pp. 124–125.

* cited by examiner

*Primary Examiner*—St. John Courtenay, III
(74) *Attorney, Agent, or Firm*—Hogan & Hartson, LLP

(57) ABSTRACT

A device input/output ("I/O") monitoring mechanism serving as an interface between a computer operating system kernel and a device driver which obviates the necessity of implementing specific pseudo-device drivers for various peripheral devices and provides a standard interface between, for example, computer mass storage devices and a computer operating system. The I/O monitoring mechanism disclosed is of especial utility in the measurement of general storage device I/O performance and allows I/O statistics to be presented to application-level software operating in conjunction with a computer operating system which facilitates the identification of storage device "hot spots" within meta-devices and sub-metadevices. The mechanism of the present invention is usable across a wide range of storage device peripheral hardware and device drivers and allows user-level program code to readily determine the associated physical sub-component.

12 Claims, 5 Drawing Sheets

DEVICE I/O MONITORING MECHANISM FOR A COMPUTER OPERATING SYSTEM

RELATED INVENTIONS

This is a division of application Ser. No. 08/544,933 filed on Oct. 18, 1995 now U.S. Pat. No. 5,809,303, which is hereby incorporated by reference in its entirety.

BACKGROUND OF THE INVENTION

1. Field of the Invention

The present invention relates, in general, to the field of computer operating systems. More particularly, the present invention relates to a device input/output ("I/O") monitoring mechanism serving as a pseudo-device driver, or interface, between a computer operating system kernel and a device driver.

2. Relevant Background

Device drivers comprise that portion of a computer operating system that contains hardware specific knowledge of a particular peripheral device. Such peripheral devices may include, for example, computer mass storage devices such as disk drives, mirrored storage devices, redundant arrays of inexpensive disks ("RAID"), hierarchical storage devices, virtual disks and the like. As a general rule, a particular device driver may, or may not, provide statistics back to the operating system kernel on device I/O operations according to its own predetermined metrics. Consequently, comparison of I/O statistics between devices may be rendered meaningless, very difficult or impossible due, respectively, to the possibly differing assumptions in the driver's metrics, specific implementations or actual unavailability of the data.

To this end, while pseudo-device drivers for interfacing between an operating system kernel and a device driver have previously been developed, inter alia, to monitor device I/O, they have been generally designed with a specific piece of hardware or software implementation in mind. That is, they have been specialized "piggy-back" drivers for coupling to a particular storage device or to traces generated from modified operating system software. As a result, specific knowledge of some portion of the hardware/software system being monitored was required in order to implement them.

SUMMARY OF THE INVENTION

The device I/O monitoring mechanism of the present invention obviates the necessity of implementing specific pseudo-device drivers for various peripheral devices and provides a standard interface between, for example, computer mass storage devices and a computer operating system. As a consequence, it is of especial utility in the measurement of general device I/O performance and can be utilized in conjunction with "opaque" (or "black box") devices without specific knowledge of their internal implementation.

More specifically, the device I/O monitoring mechanism of the present invention allows I/O statistics to be presented to application-level software operating in conjunction with a computer operating system which facilitates the identification of storage device "hot spots" within metadevices and sub-metadevices. The mechanism of the present invention is usable across a wide range of storage device peripheral hardware and device drivers and allows user-level program code to readily determine the associated physical sub-component.

In order to effectuate the foregoing, disclosed herein is a peripheral device I/O monitor for a computer having an operating system with a device statistics presentation mechanism resident thereon and also including a hardware abstraction layer for interfacing to an associated peripheral device. The peripheral device includes a device driver operatively responsive to the hardware abstraction layer of the computer operating system. The device I/O monitor comprises a pseudo-device driver operatively interposed between the hardware abstraction layer of the computer operating system and the device driver and itseif presents corresponding first and second pseudo-device driver hardware abstraction layers. The first pseudo-device driver hardware abstraction layer is coupled to the computer operating system and the second pseudo-device driver hardware abstraction layer is coupled to the device driver.

In accordance with a method of the present invention, I/O metrics for a peripheral device coupled to a computer may be determined wherein the computer includes a computer operating system incorporating a device driver for the peripheral device. The method comprises the steps of: intercepting one or more selected calls from the computer operating system to the device driver; providing for initiating a call back to a portion of the operating system to record an occurrence of the one or more selected calls; and providing for passing the one or more selected calls to the device driver. In accordance with a more specific method, the method may comprise the additional steps of: further intercepting one or more selected device calls from the device driver to the computer operating system; further initiating an additional call back to the operating system to record an occurrence of the one or more selected device calls; and further passing the one or more device calls to the operating system. The one or more selected calls may advantageously be "read", "write" or "strategy" operations when utilized in conjunction with a UNIX® System V compliant operating system.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
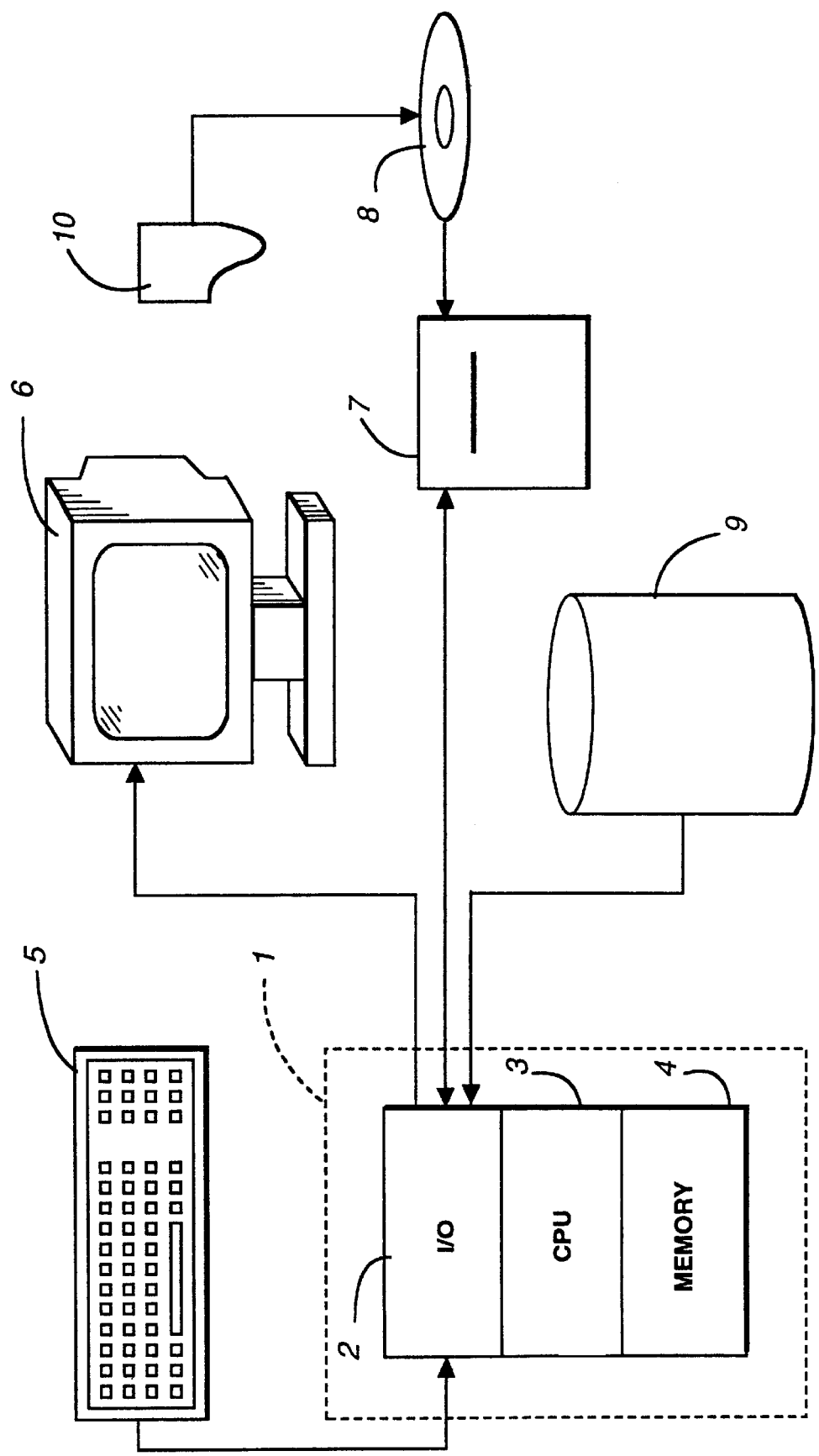
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 10 and data. The computer program products containing mechanisms to effectuate the apparatus and methods of the present invention may reside in the memory section 4, or on a disk storage unit 9 or on the CDROM 8 of such a system.

Figure 2:
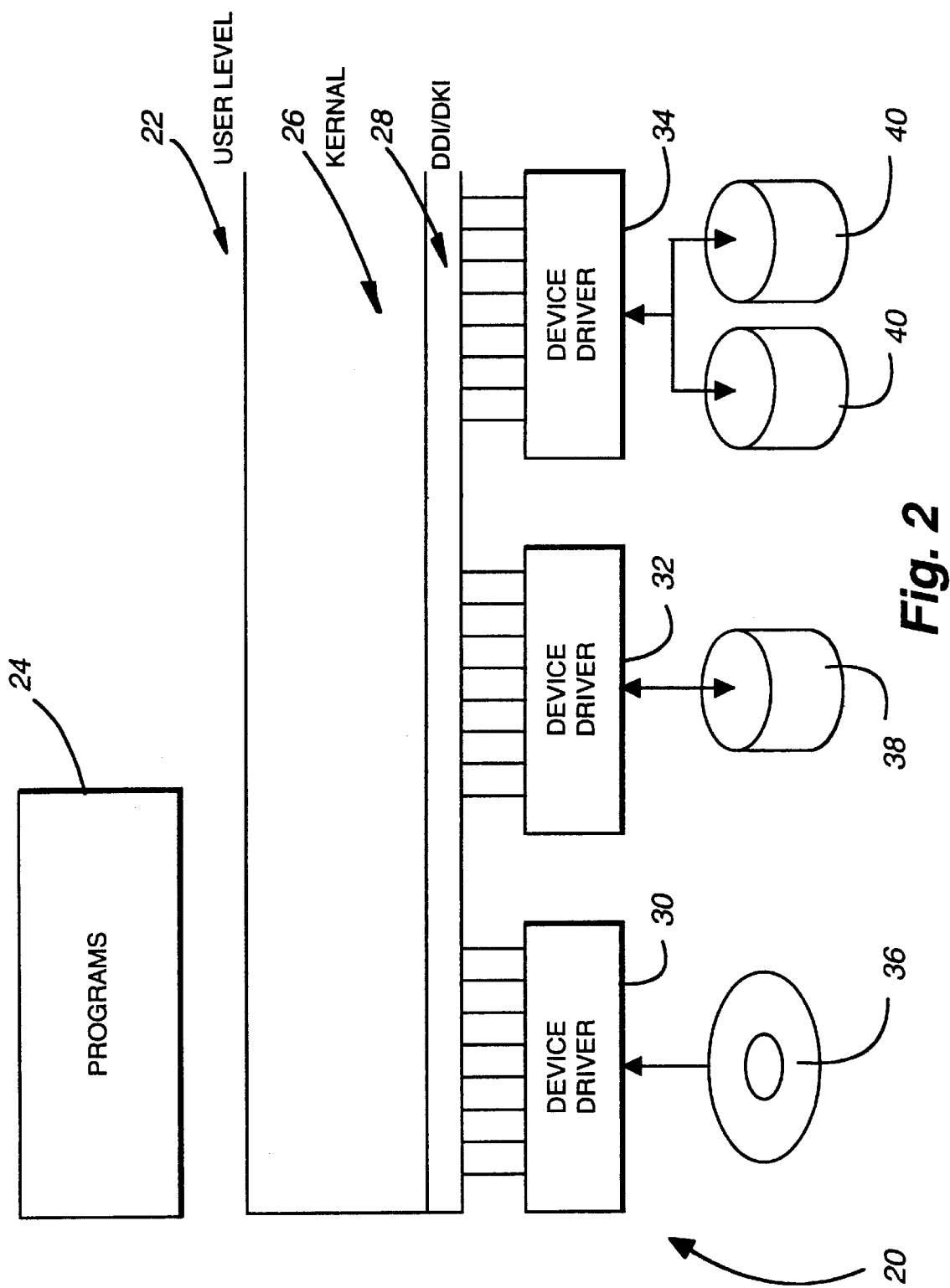
FIG. 2 is a simplified representational drawing of a computer operating system illustrating the kernel and various device drivers as interfaced by a Device Driver Interface/Device Kernel Interface ("DDI/DKI") hardware abstraction layer in a conventional configuration and further illustrating various types of computer mass storage devices and their associated drivers.

With reference now to FIG. 2, a simplified representational view of a computer operating system 20 is shown. The computer operating system 20 includes a user level 22, at which level various application programs 24 may be run. The user level 22 overlies a kernel 26 which includes, in the case of a UNIX System V compliant operating system such as Solaris™, developed and licensed by Sun Microsystems, Inc., assignee of the present invention, a DDI/DKI interface 28 as will be more fully described hereinafter. The DDI/DKI interface 28 couples the kernel 26 to a number of device drivers, such as the representative device drivers 30–34 which contain hardware specific code regarding particular peripheral devices such as the computer mass storage devices illustrated, wherein device 36 represents a CDROM, device number 38 represents an industry standard disk drive and devices 40 represent a pair of mirrored disk drives.

The illustration of FIG. 2 depicts a generalized System V compliant operating system 20 incorporating a DDI/DKI interface 28 hardware abstraction layer ("HAL") or hardware interface layer. The device drivers 30–34 incorporate the specialized code necessary to communicate with the corresponding devices 36–40. Utilization of a standard hardware abstraction layer such as the DDI/DKI interface 28 allows the operating system to be most readily interfaced to drivers 30–34 specifically written for communication with respective devices 36–40 of differing manufacturers and the interface between the drivers and the kernel 26 remains the same regardless of the device characteristics. In System V compliant operating systems, peripheral device "reads", "writes" and other special operations are denominated as I/O control ("ioctl") and any specific operation for a given device 36–40 (as to its sectors, platters, read/write heads and the like) is coded as a part of the corresponding device driver 30–34 in order to enable the operating system 20 to select the data requested. Generally, computer mass storage devices deal in chunks of data called "blocks". However, the application programs 24 relate data to named files or persistent objects and the blocks do not have specific file names associated with them. Calls to "open" and "read" a particular file are routed through the operating system 20 file system which then maps the file names to particular blocks on the storage device.

Figure 3:
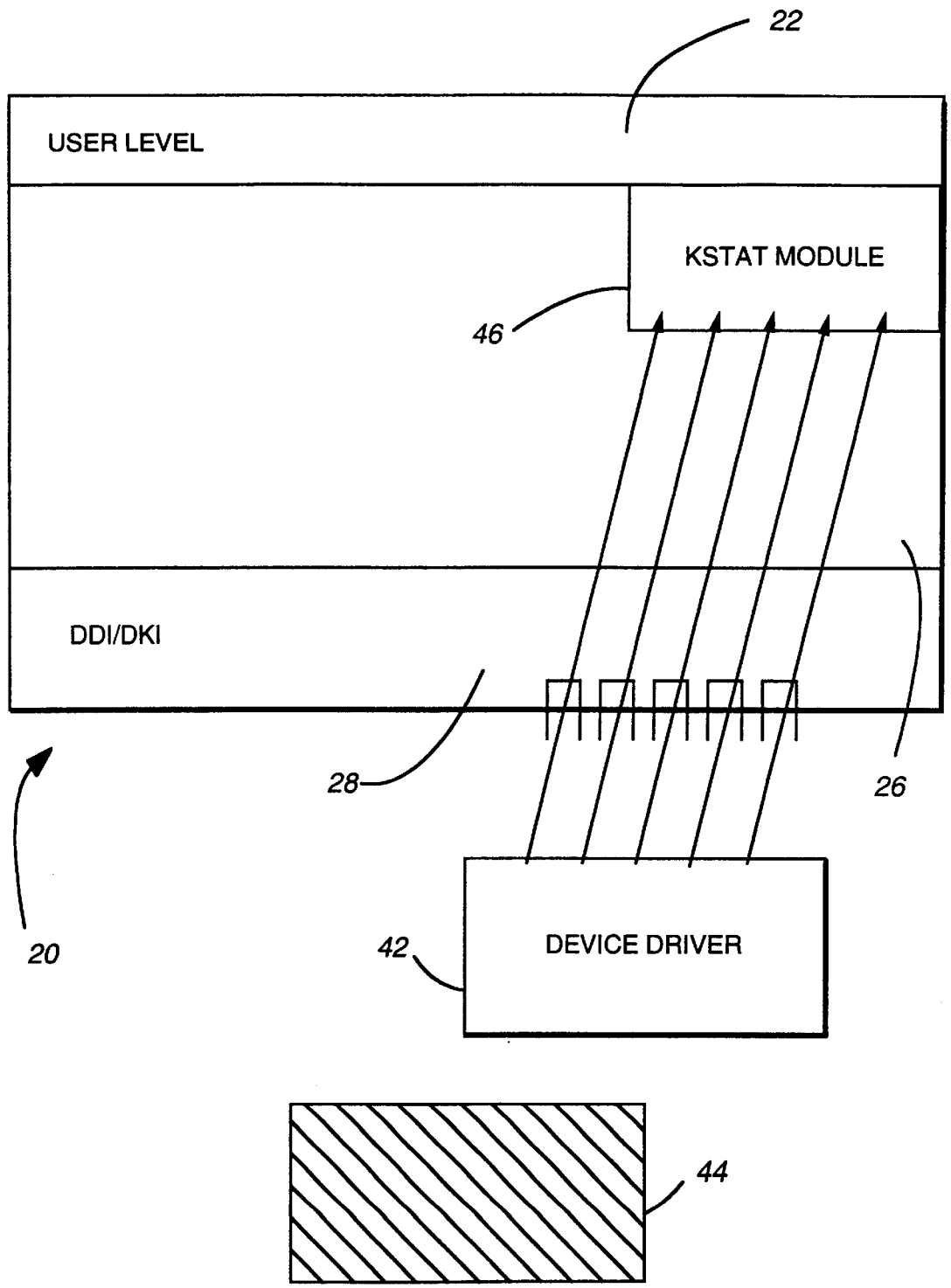
FIG. 3 is an additional simplified representational view of the computer operating system and driver of FIG. 2 and further illustrating the kernel statistics ("KSTAT") module within the kernel of a particular operating system which functions as a device driver statistics module for the peripheral device drivers.

With reference additionally now to FIG. 3, the interaction between a generic device driver 42 and the KSTAT module 46 of the operating system 20 kernel 26 is shown. A "black box" driver 40 having unknown characteristics for interface to a specific device (not shown) is also illustrated. Structure and layers analogous to that previously described with respect to the preceding figures is like numbered and the foregoing description thereof shall suffice herefor. As previously described, the layer between the kernel 26 and the device drivers 42, 44 is called the DDI/DKI interface 28. The DDI/DKI interface 28 is strictly defined, inclusive of specific routines that call into a portion of the operating system 20 called the kernel statistics ("KSTAT") module 46. Included in the DDI/DKI interface 28 are a number of interfaces, or methods, to call in from a device driver 42, 44 into that portion of the kernel 26. Among the things that a device driver 42, 44 may communicate to the kernel 26 is how many I/O operations it has outstanding, how long it's taking for those operations to be completed, the size of those operations, and the types (i.e. "read" or "write") of those operations. By supplying these generic interfaces to the KSTAT module 46, the device drivers 42, 44 do not have to undertake I/O bookkeeping themselves. Utilizing the KSTAT module 46, the device drivers 42, 44 merely have to communicate a call and set appropriate counters in the KSTAT module 46 which then addresses the presentation of the I/O data to the user.

In the case of a "black box" device driver 44 associated with an unknown computer mass storage device, it may only be known that it somehow provides data storage and plugs into the DDI/DKI interface 28. However, nothing may be known about its I/O operations. In that case, it cannot be determined whether or not the unknown device driver 44 is any better or any worse than the device driver 42 and it has heretofore been impossible to determine how many I/O operations are outstanding, how long they are taking and the like rendering it very difficult to characterize the unknown device driver 44.

Figure 4:
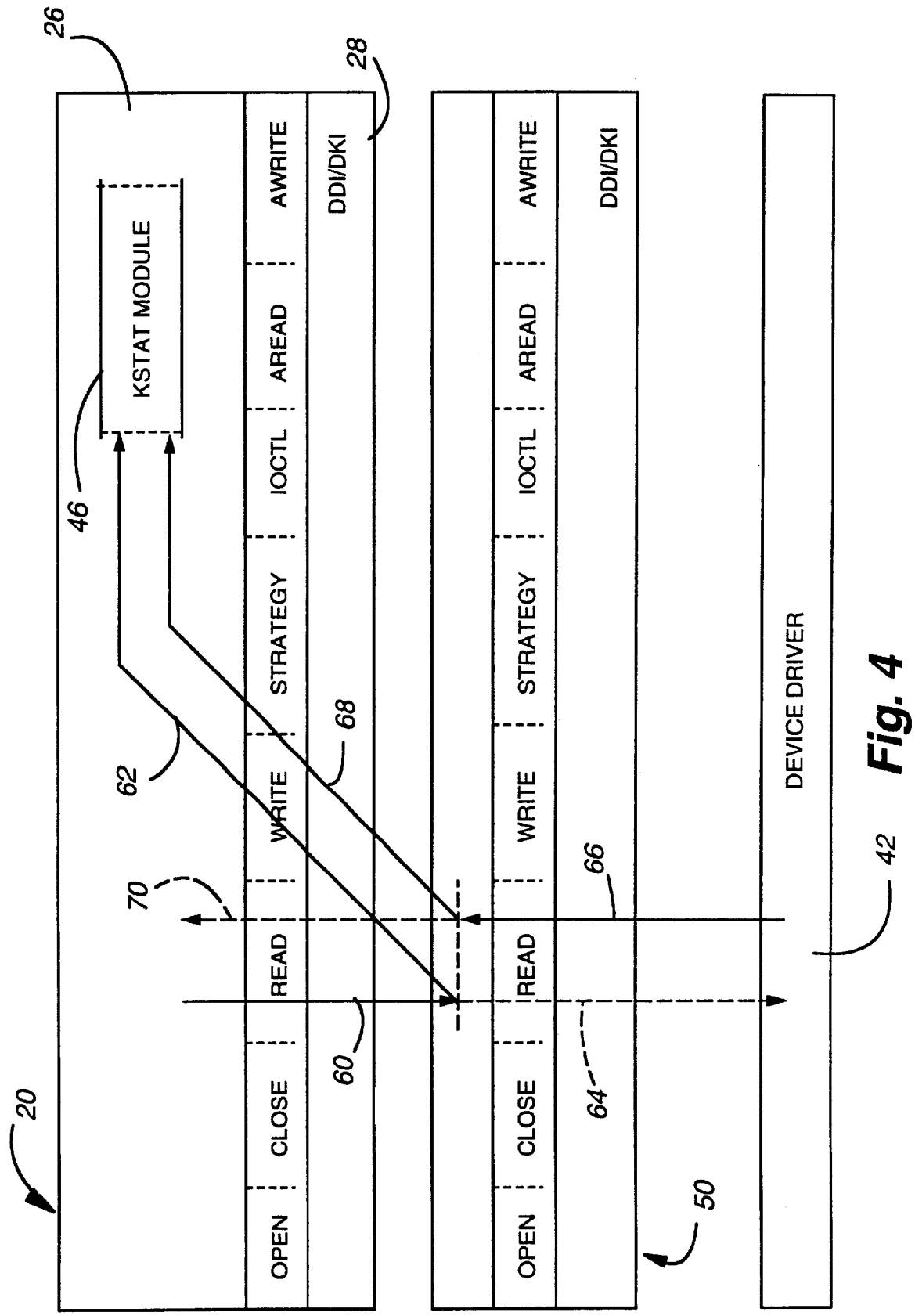
FIG. 4 is a further simplified representational view of a computer operating system including a DDI/DKI interface and a device I/O monitoring mechanism in the form of a pseudo-device driver interposed between the operating system and a device driver for updating the KSTAT module in the event of the occurrence of certain I/O access operations between the operating system and a device driver.

With reference additionally now to FIG. 4, the various calls which may be made through a standard DDI/DKI interface 28 associated with the operating system 20 kernel 26 are shown in conjunction with the pseudo-device driver 50 of the present invention. As an example, an operating system call 60 is issued which is intercepted by the pseudo-device driver 50 to make a callback 62 to the KSTAT module 46. The call 60 then proceeds through as a passed-through call 64 to the device driver 42. Likewise, a device call 66 is intercepted from the device driver 42 and, in response, a call to the KSTAT module 46 is issued by the pseudo-device driver at 68. The device call 66 is then passed through as a passed through call 70.

In addition to the "ioctl" call mentioned previously, the kernel 26 may issue a call to "open" which instructs the device driver 42 to open, for example, partitions. On the other hand, the "close" instruction indicates that whatever operation has been undertaken since the "open" (i.e. "read" where the mass storage device sectors actually begin) has been completed. Alternatively, the device driver 42 may function to pre-position the data transducers of an associated mass storage device to anticipate a subsequent "read" or "write" command. As illustrated, System V compliant operating systems also include a "strategy" routine which is a type of generalized "read" or "write" operation. The designations "aread" and "awrite" designate asynchronous reads and writes respectively.

The pseudo-device driver 50 of the present invention provides hooks into the DDI/DKI interface 28 and, itself presents first and second DDI/DKI interfaces between the operating system 26 and the device driver 42. These hooks allow it to provide information back to the KSTAT module as to how many I/O operations are currently in progress, how long they have been taking and the length of the queues, etc.

In the example shown, if the kernel 26 issues an operating system call 60 constituting a "read" to the device driver 42 associated with a particular computer mass storage device or subsystem, the pseudo-device driver 50 recognizes that event and makes a callback 62 to the KSTAT module 46 to increment a counter to record that the read call 60 has been issued. The pseudo-device driver 50 then passes the call 60 on to the device driver 42 as shown by the dashed line 64. When the "read" operation is completed, the device driver 42 issues a device call 66 which is detected by the pseudo-device driver 50 to then issue an additional call to the KSTAT module 46 signifying the completion of this particular I/O operation. As before, the pseudo-device driver 50 then passes the device call 66 through to the kernel 26 as indicated by dashed line 70 completing the operation.

In this manner, "black box" device drivers (such as device driver 44 of FIG. 3) can be measured such that it may be accurately compared with competitive drivers. Moreover, since the pseudo-device driver 50 identifies and monitors I/O operations of particular interest, it can provide information to the operating system 20 KSTAT module 46, and hence to application programs regarding I/O metrics. In fact, more than merely generalized information about a particular peripheral may be monitored and a given disk drive or disk subsystem may be treated as a succession of smaller disk drives to provide statistics on particular cylinders, regions, platters or the like to determine "hot spots" or where the device is fastest or, conversely, where it is slowest. This information may, of course, then allow I/O operations to be selectively moved around to optimize overall performance or merely provide confirmation that a device may not be operating properly (such as, for example, the identification of a number of "re-try"s on particular blocks). Stated another way, the pseudo-device driver 50 is an enabler for other device monitoring tools through the existing KSTAT module 46 while remaining essentially transparent to calls between the operating system 20 and a given device driver 42. This is of especial utility in conjunction with databases which would desirably be able to have their index tables located at the fastest portion of a particular storage device or subsystem to speed operations attempting to access data pointed to by the table. Alternatively, the pseudo-device driver 50 and the detailed knowledge it can accumulate regarding I/O operations and specific device functionality would enable the relocation of large graphics files to storage areas that exhibit greater speed for large I/O operations.

The pseudo-device driver 50 allows information to be supplied to the KSTAT module 46 about other than just traditional "open" and "close" calls but also, for example, with respect to "reads" "writes" and "strategy" calls without specific knowledge of the particular device driver 42 then being accessed or whenever a specific command is passed through it and about which it has no other knowledge. The pseudo-device driver 50 is not designed to "error off" as a normal device driver would upon receipt of an unrecognized command and such a command would be, instead, merely passed on to the device driver 42 for it to return an error back if appropriate, which error is then passed back up through to the kernel. "Done" routines may also be captured and recognized by the pseudo-device driver 50. Upon receipt of an I/O call of interest, the pseudo-device driver 50 increments the appropriate counters in the KSTAT module 46 and then takes note of the times when they are occurring and their "done" times in order to calculate the duration of that particular operation.

As an example, private I/O control may be provided to record I/O information about a particular disk drive, or a region of a particular drive. In operation, the pseudo-device driver 50 is set up (or administered) as a device driver and the type of information to be monitored is then defined. As part of the administration of the pseudo-device driver 50 of the present invention, it may be loaded into the kernel 26 as with conventional device drivers. The operations to be monitored are then defined with respect to the actual device, the number of regions or size of the regions to be monitored and the like.

Figure 5:
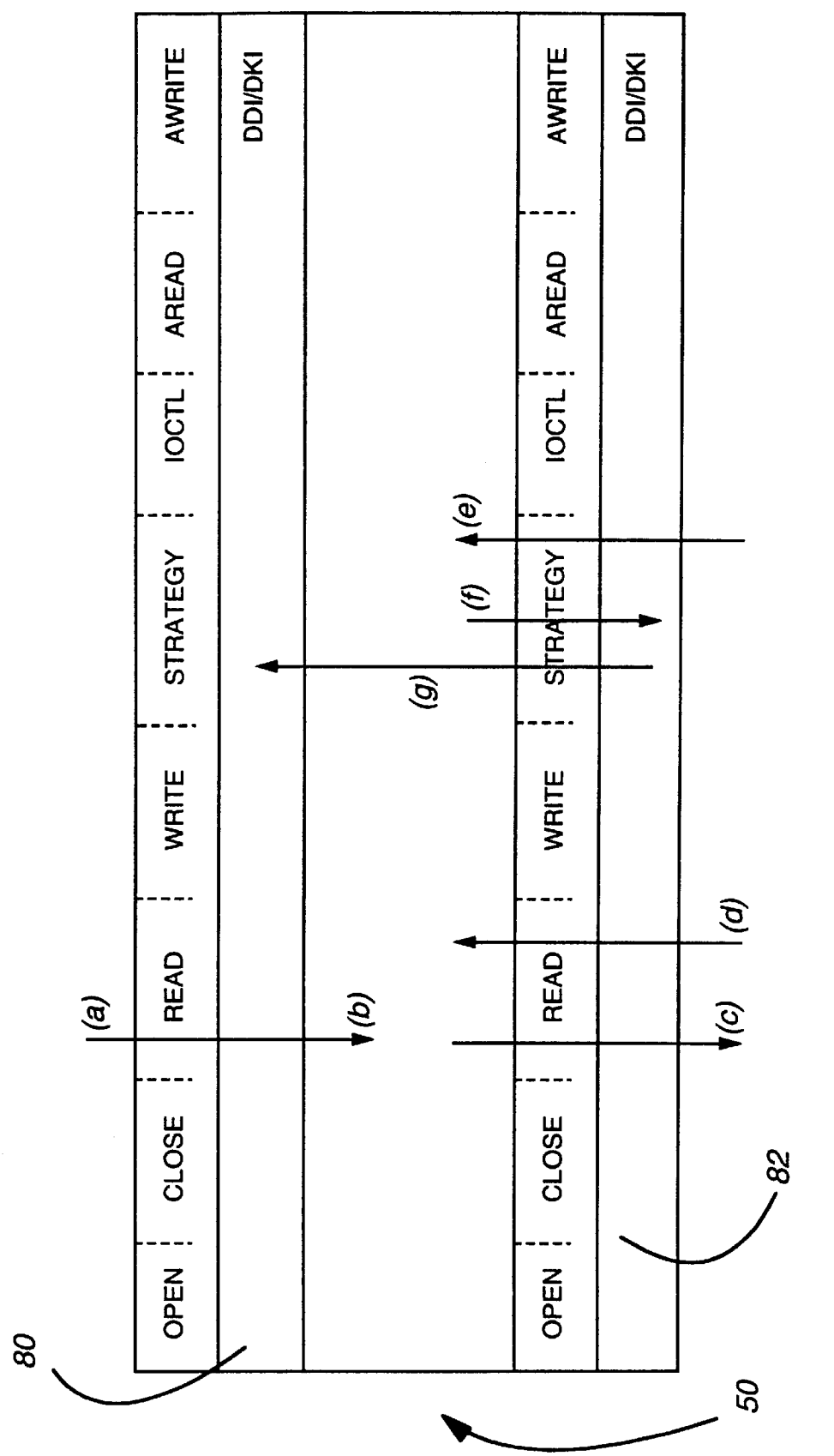
FIG. 5 is a more detailed illustration of the sequence of calls and call-backs initiated between the operating system and device driver through the I/O monitoring mechanism of FIG. 4 during a representative access to a computer mass storage device during operation thereof.

With reference now to FIG. 5, a further exemplary scenario is illustrated in conjunction with the pseudo-device driver 50 of FIG. 4 to more fully illustrate the operating system level and device driver level DDI/DKI interfaces 80, 82 thereof.

At line (a) a "read" operation is initiated, with the assumption that "reads" are operations of interest to the pseudo-device driver 50 as administered. Operations which are not of interest are passed directly through the pseudo-device driver 50, without intervention, to the device driver. Since the pseudo-device driver 50 has been administered to react to "reads", at (b) the KSTAT module is incremented and the time recorded directly or by I/O operation number in order to later reconstruct the time of its initiation.

At (c), the "read" operation is passed on down to the device driver which then causes a "read" operation to occur in a conventional manner. Upon completion of the operation at (d), there is a call-back made and it presents the data read from the mass storage device.

At (e), an end of operation signal is sent to the KSTAT module which is referenced either to time or operation identifier and/or in conjunction with a decrementing of the number of current operations outstanding and an incrementing of the count of operations completed. In operation, the pseudo-device driver 50 is transparent to the intended interaction between the kernel and the device driver with only confirmation to the KSTAT module when something of interest is received from the kernel that's intended for the driver. The pseudo-device driver also informs the KSTAT module when something is received from the driver that is intended for the kernel. The same scenario holds true for "writes" in addition to "reads" with only the direction of the data transfer being different.

"Strategy" operations are similar to "read" and "write" operations with the difference primarily being that fixed size I/Os are generally encountered. At (f) a call is directed back to the device driver which then at (g) initiates the actual "done" message.

In general, "read", "write" and "strategy" I/O operations will be of interest in determining device metrics. On the other hand, I/O "open", "close", "ioctl", "aread" and "awrite" may not be considered particularly interesting (although their measurement may be of interest in other applications) and are merely passed through to the device driver.

With reference to the following Table 1, CB_OPS_VECTOR operations are shown which map the new "read", "write" and "strategy" operations in conjunction with the pseudo-device driver 50 of the present invention. Other operations remain unchanged. The table illustrates entries which are labeled "open", "close" etc. with their values corresponding to the names of the device upon which the operation is to occur (i.e. "disk open"). With respect to the "read", "write" and "strategy" operations, the actual routines to be called are shown. The values of these routines include the address in memory to which to direct the program control flow.

TABLE 1

| OPEN | CLOSE | READ | WRITE | STRATEGY | IOCTL | AREAD | AWRITE |
|------|-------|------|-------|----------|-------|-------|--------|
| disk_OPEN() | disk_CLOSE() | NEW_READ() | NEW_WRITE() | NEW_STRAT() | disk_IOCTL() | disk_AREAD() | disk_AWRITE() |

In the specific embodiment described above, the Solaris® operating system, available from Sun Microsystems, Inc., assignee of the present invention, DDI/DKI interface 28 defines the KSTAT module 46 interface. This provides a mechanism for I/O statistics to be presented to application-level code in a standard format which is defined in the kstat(3K) manual page under the description of KSTAT_IO_TYPE kernel statistics.

In order to present this data, calls into the KSTAT module need to be made in driver "strategy" and "done" routines. Because the buffer header b_iodone field is not a chain but a replacement done routine, it is necessary to wrap transactions in a separate buffer header. The strategy routine is redirected to the pseudo-device driver 50 strategy routine to increment appropriate kstat counters in the KSTAT module 46, but otherwise it is intended to be a "pass-through" operation. All other entry points simply pass through to the underlying device 44.

Intra-device statistics are most useful when they can be used to identify hot spots. This requires a mechanism to define the granularity of the chunks on which statistics will be taken. The pseudo-device driver 50 includes an "ioctl" which defines the size of these extents. Limiting factors on this are the number of bits in a daddr_t. This allows the measurement to be made down to the block level, although the defaults may be much larger, depending upon the application accessing the device. When the extent sizes are defined, kstat_io_type structures may be created and initialized. Presentation of this data can be done by "metatool", "iostat" or another mechanism and need only comply with the current kstat/kvm library interface.

I/O history, and thus determination of device "hot spots", is ultimately the responsibility of user-level code with all of the implementation and customizability that implies. One significant advantage of the present invention is that it allows this mechanism to be used on top of "opaque" or "black box" devices. In general, a mutex may be required around all pseudo-device driver 50 operations in order to prevent module unloading while active. However, the impact of this can be minimized by using multiple mutexes and counters incurring the overhead upon attempts to modunload, rather than on every call into this layer.

While there have been described above the principles of the present invention in conjunction with specific operating systems, device drivers and peripheral devices, the foregoing description is made only by way of example and not as a limitation to the scope of the invention. Particularly, it should be noted that the principles of the present invention are applicable to the IBM AIX™ and MicroSoft Windows NT™ operating systems (or other UNIX® System V compliant operating systems in addition to the Sun Microsystems, Inc. Solaris™ implementation shown) as well as any other operating system that provides a generic kernel to device driver interface in conjunction with device statistics presentation mechanism.

What is claimed is:

1. A method for determining input/output metrics for a peripheral device coupled to a computer, said computer including a computer operating system incorporating a device driver for said peripheral device, the operating system including an input/output metrics presentation mechanism, said method comprising the steps of:

providing for intercepting one or more selected calls from said computer operating system to said device driver;

providing for initiating a call back to a portion of said operating system in response to the interception of said one or more selected calls to record an occurrence of said one or more selected calls;

providing for passing said one or more selected calls to said device driver; and determining the input/output metrics for the peripheral device using an input/output presentation mechanism of the operating system and the recorded occurrences of the one or more intercepted selected calls.

2. The method of claim 1 wherein said one or more selected calls is an access to said peripheral device selected from a group comprising read, write and strategy operations.

3. The method of claim 1 further comprising the steps of:

providing for further intercepting one or more selected device calls from said device driver to said computer operating system;

providing for further initiating an additional call back to said portion of said operating system to record an occurrence of said one or more selected device calls; and providing for further passing said one or more device calls to said operating system.

4. A computer program product comprising:

a computer usable medium having computer readable code embodied therein for determining input/output metrics for a peripheral device coupled to a computer, said computer including a computer operating system incorporating a device driver for said peripheral device, the computer program product comprising;

computer readable program code devices configured to cause the computer to effect intercepting one or more selected calls from said computer operating system to said device driver;

computer readable program code devices configured to cause the computer to effect initiating a call back to a portion of said operating system in response to the interception of said one or more selected calls to record an occurrence of said one or more selected calls; and computer readable program code devices configured to cause the computer to effect passing said one or more selected calls to said device driver; and computer readable program code devices configured to cause the computer to effect determining the input/output metrics for the peripheral device using an input/output presentation mechanism of the operating system and the recorded occurrences of the one or more intercepted selected calls.

5. The computer program product of claim 4 further comprising:

computer readable program code devices configured to cause a computer to effect further intercepting one or more selected device calls from said device driver to said computer operating system;

computer readable program code devices configured to cause a computer to effect further initiating an additional call back to said portion of said operating system to record an occurrence of said one or more selected device calls; and computer readable program code devices configured to cause a computer to effect further passing said one or more device calls to said operating system.

6. A method for determining input/output (I/O) metrics for a peripheral device in a computer system having an operating system with an I/O metrics presentation mechanism and a generic interface for communication with a generic interface of a device driver associated with the peripheral device, the method comprising:

presenting generic pseudo-interfaces to the generic interfaces of the operating system and the device driver to intercept I/O-related calls between the operating system and the device driver;

in response to the intercepted I/O-related calls, generating corresponding calls to the I/O metrics presentation mechanism of the operating system to record the occurrences of the intercepted I/O-related calls; and using the I/O metrics presentation mechanism of the operating system and the recorded occurrences of the intercepted I/O-related calls to determine I/O metrics for the peripheral device.

7. The method of claim 6, wherein the generic interfaces of the operating system and the device driver comprise hardware abstraction layers, wherein the act of presenting generic pseudo-interfaces comprises interposing a pseudo-device driver with pseudo-hardware abstraction layers between the operating system and the device driver.

8. The method of claim 6, wherein the act of using the I/O metrics presentation mechanism of the operating system and the recorded occurrences of the intercepted I/O-related calls to determine I/O metrics for the peripheral devices comprises using the I/O metrics presentation mechanism of the operating system and the recorded occurrences of the intercepted I/O-related calls to determine at least one I/O metric selected from a group comprising the number of outstanding I/O operations, the length of time it takes for I/O operations to be performed, the size of I/O operations, and the types of I/O operations.

9. The method of claim 6, further comprising:

transparently passing those of the intercepted I/O-related calls initiated by the operating system on to the device driver, and those of the intercepted I/O-related calls initiated by the device driver on to the operating system.

10. The method of claim 9, wherein the act of transparently passing on the intercepted I/O-related calls includes passing on unrecognized calls without generating error call backs independent of any error call backs generated by the operating system and the device driver.

11. A method for determining input/output (I/O) metrics for a peripheral device in a computer system having an operating system with a generic interface for communication with a generic interface of a device driver associated with the peripheral device, the method comprising:

presenting generic pseudo-interfaces to the generic interfaces of the operating system and the device driver to intercept I/O-related calls between the operating system and the device driver;

in response to the intercepted I/O-related calls, generating corresponding calls back to the operating system to record the occurrences of the intercepted I/O-related calls; and using the operating system which includes an input/output metrics presentation mechanism and the recorded occurrences of the intercepted I/O-related calls to determine I/O metrics for the peripheral device.

12. Computer code embodied in a computer-readable medium for recording input/output (I/O) metrics data for a peripheral device in a computer system having an operating system with a generic interface for communication with a generic interface of a device driver associated with the peripheral device, the computer code comprising:

a pseudo-device driver having generic pseudo-interfaces for communication with the generic interfaces of the operating system, the operating system including an input/output metrics presentation mechanism and the device driver to intercept I/O-related calls between the operating system and the device driver and, in response to the intercepted I/O-related calls, for generating corresponding calls back to the operating system to record the occurrences of the intercepted I/O related calls, thereby recording and determining I/O metrics data, using the input/output metrics presentation mechanism, for the peripheral device.

* * * * *